US006377286B1

(12) United States Patent
Hochmuth

(10) Patent No.: US 6,377,286 B1
(45) Date of Patent: *Apr. 23, 2002

(54) TEMPORAL DESKTOP AGENT

(75) Inventor: Roland M. Hochmuth, Ft. Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,238

(22) Filed: Jan. 13, 1998

(51) Int. Cl.[7] .................................................. G09G 5/00
(52) U.S. Cl. ...................... 345/810; 345/847; 345/811; 345/812
(58) Field of Search ................................. 345/333, 348, 345/352, 334, 336, 339, 847, 710, 742, 762, 809, 810–811, 812, 825

(56) References Cited

U.S. PATENT DOCUMENTS

| 5,241,655 A | * | 8/1993 | Mineki ........................ 345/354 |
| 5,367,626 A | * | 11/1994 | Morioka ...................... 345/348 |
| 5,491,795 A | * | 2/1996 | Beaudet ....................... 345/346 |
| 5,564,004 A | * | 10/1996 | Grossman et al. ........... 345/351 |
| 5,673,405 A | * | 9/1997 | Tange .......................... 345/333 |
| 5,692,143 A |   | 11/1997 | Johnson et al. .............. 395/339 |
| 5,694,563 A | * | 12/1997 | Belfiore et al. .............. 345/340 |
| 5,805,159 A | * | 9/1998 | Bertram et al. .............. 345/339 |
| 6,091,409 A | * | 7/2000 | Dickman et al. ........... 345/847 |

OTHER PUBLICATIONS

Alan Simpson, Windows 95 Uncut, IDG Books, 1995, pp. 78–95 and pp. 151–161 . .*
Alan Simpson, Windows 95 Uncut, IDG Books Worldwide, pp. 84–91, 1995.*
Robert Cowart, Mastering Windows 3.1 Special Edition, Sybex, pp. 48–67, 1992.*
"Microsoft Press Computer Dictionary, Third Edition", Microsoft Corporation, 1997.*
Microsoft Windows NT, 1996.*

* cited by examiner

Primary Examiner—Raymond J. Bayerl
Assistant Examiner—Thomas J Joseph

(57) ABSTRACT

File accesses initiated by a graphical user interface are monitored. When the number of accesses exceeds a specified threshold number of times in less than a specified period of time, and that file is not already represented on the computer desktop, an icon representing that file may be placed on the computer desktop. The user may be queried to determine if an icon representing that file should be placed on the desktop. If a particular icon residing on the computer desktop has not been used more than a specified number of times is more than a specified period of time, that icon may be removed from the computer desktop. The user may be queried to determine if that icon should be removed from the computer desktop. That icon may also be relocated to a temporary location so that it may be easily accessed.

18 Claims, 8 Drawing Sheets

TEMPORAL DESKTOP AGENT

BACKGROUND OF THE INVENTION

1. Field of the Invention

This invention relates generally to data processing. More particularly this invention relates to graphical user interfaces. Even more particularly, this invention relates to a system and method of automatically managing the display of objects in a graphical user interface.

2. Background of the Invention

Graphical user interfaces have improved the ease with which many tasks may be accomplished on a computer. In a traditional text-based user interface, a user would have to remember the file name and path of the application, and the arguments given to that application in order to execute it. In a graphical user interface, the user need only activate an icon that represents the application and select the arguments when prompted to execute that application. Since the properties assigned to the graphic icon link it to the executable file and specify its complete directory path, there is no need to memorize that information. Microsoft Corporation's WINDOWS™ and Apple Computer, Inc.'s MacIntosh™ operating systems are examples of successful graphical user interfaces.

Many of these graphical user interfaces use a desktop metaphor as a working environment. With a desktop metaphor, the user interacts with icons and other graphical objects as if they resided on a real desktop. The user may add, remove, and reposition these graphical objects by using a mouse, or other pointing device. Furthermore, the user may use the pointing device to select graphical objects that will run certain programs, or edit certain files.

Unfortunately, not all the programs and files are represented by graphical objects residing on the computer desktop. The large number of programs and files available to the user makes display of a graphical representation of each of them impractical. The computer desktop would be horribly cluttered and/or the graphical representations too small to convey any meaningful information about the program or file they represent.

The solution to this problem chosen by modern graphical user interfaces is to only represent a small number of frequently used programs or files on the computer desktop. The files and programs represented are initially chosen by the authors of the graphical user interface, but may be changed by the user. The rest of the programs and files accessible to the user must be selected through the use of less convenient means such as pull-down or pop-up menus, dialog boxes, and windows showing nested folders that represent a directory tree.

A shortcoming of this solution is that a frequently used program or file may not be represented on the computer desktop. This forces the user to use less efficient means that require many keystrokes or mouse clicks each time that frequently used program or file is accessed. Another shortcoming of this solution is that rarely used programs or files may be represented on the computer desktop. This contributes to clutter and visual confusion making it more likely that a user will not change the representations on the computer desktop to more accurately reflect commonly used programs and files.

Accordingly, there is a need in the art for a method and system of automatically creating and removing graphical objects from a computer desktop metaphor. Such a method should maintain the computer desktop such that it accurately reflects the files and programs being most frequently accessed by the user. Also, the system should give the user the ability to override its actions to account for personal taste. And finally, such a method should be intuitive and easy to use even for an unsophisticated user.

SUMMARY OF THE INVENTION

A part of the operating system, or a part of an application, or a separate low priority process, continually runs in the background of a computer and monitors the accessing of programs and files initiated by the user through a graphical user interface (GUI). When a user accesses a program to execute it, or otherwise accesses a file via the GUI, that event is logged in a desktop event log. The desktop event log includes a reference to the program, or file, and the date and time of the access. If the number of accesses exceeds a specified threshold over a specified period of time, a graphical object representing that program, or file will be automatically or semi-automatically placed on the computer desktop. The location of the object may be determined automatically, or be chosen by the user.

A part of the operating system, or a part of an application, or a separate low priority process, continually runs in the background and monitors the usage of graphical objects that are on the computer desktop. When a particular object is not used for a specified amount of time, or not used frequently enough over a specified period of time, that object is removed from the computer desktop. The user may be queried before removal to determine if the object should be retained on the computer desktop. When an object is removed, it may be completely removed, or merely relocated to a temporary location. The temporary location may be represented on the computer desktop by a graphical object, called a stack, that is analogous to a stack of papers accumulating on a real desktop. The stack provides a convenient location for the user to view objects that have been removed from the computer desktop.

DETAILED DESCRIPTION OF THE PREFERRED EMBODIMENTS

Figure 1:
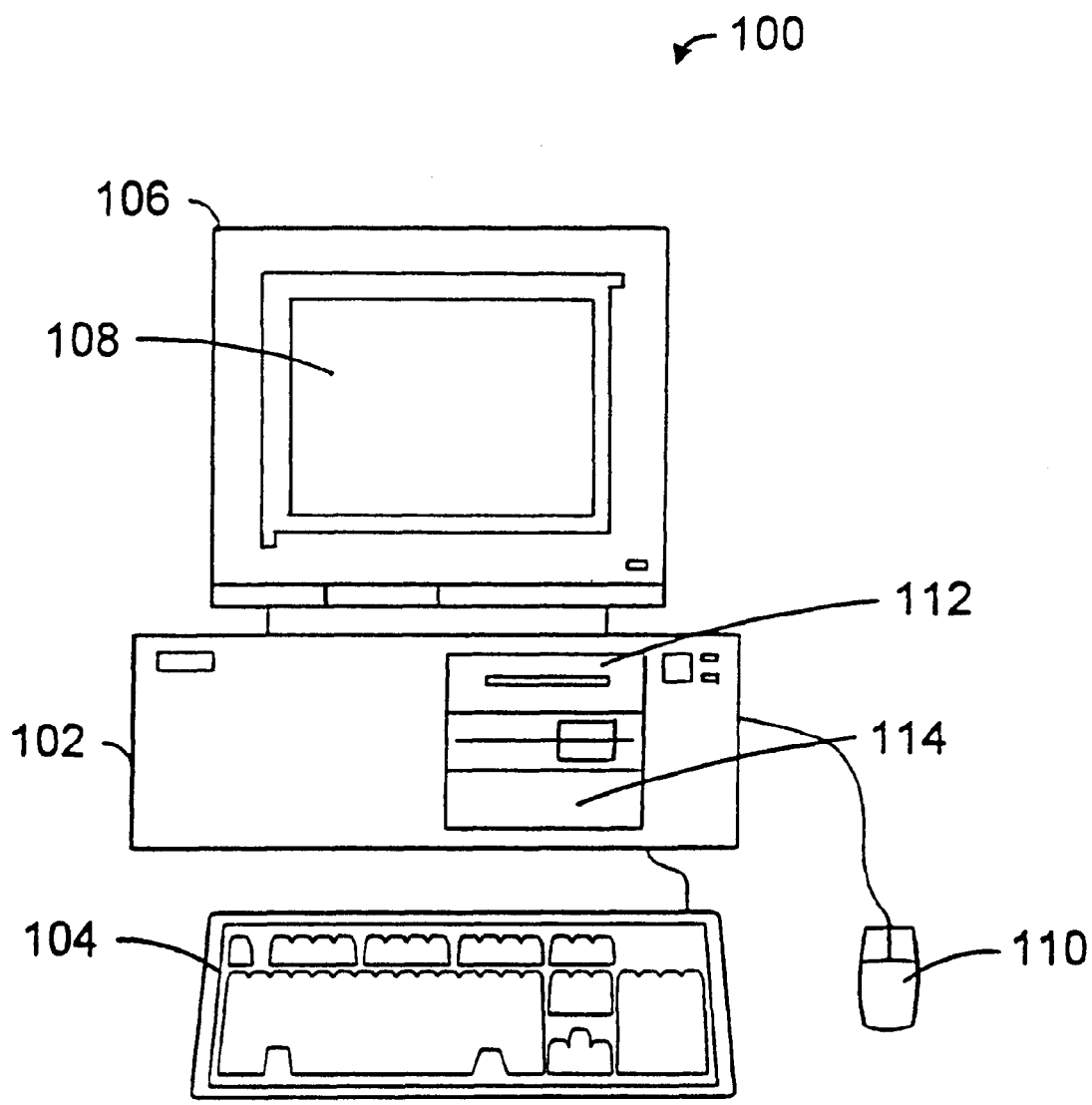
FIG. 1 is a block diagram of a computer suitable for use in implementing the present invention.
Figure 2:
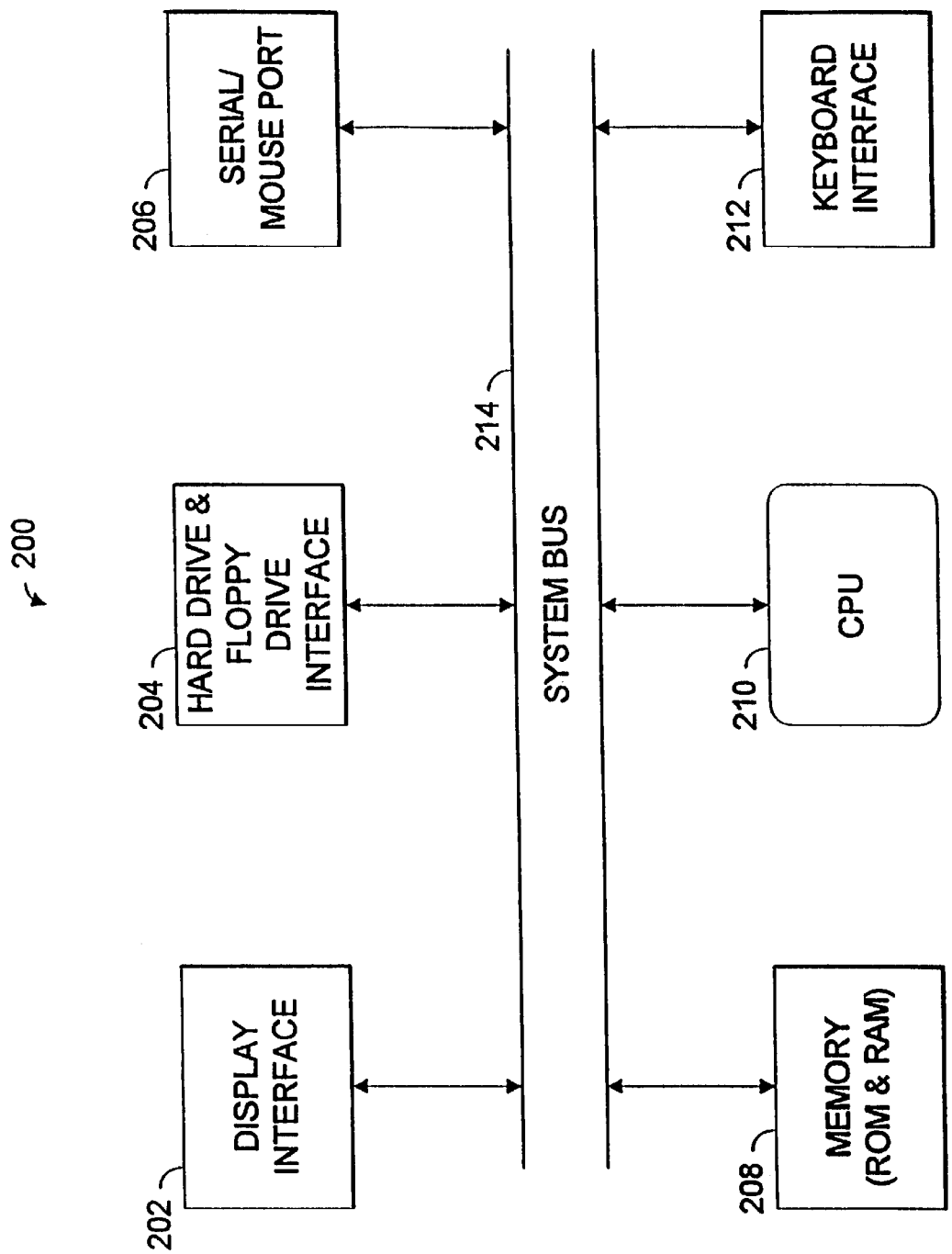
FIG. 2 is a block diagram showing the interconnection of some of the principle components inside the processor chassis of FIG. 1.

FIG. 1 illustrates a computer 100 that is suitable for implementing the present invention. Computer 100 includes a chassis 102 containing one or more circuit boards (not shown), a floppy drive 112, and a hard drive 114. A representative block diagram of the elements included on the circuit boards inside chassis 102 is shown in FIG. 2. A central processing unit (CPU) 210 is connected to a system bus 214. System bus 214 also connects to memory 208 that includes both read only memory (ROM) and random access memory (RAM); a display interface 202 that controls monitor 106 to display images on screen 108; a hard drive and floppy drive interface 204 that controls hard drive 114 and floppy drive 112; a serial mouse port 206 that communicates with mouse 110 to allow the user to manipulate a cursor or other graphical objects; and a keyboard interface 212 that communicates with keyboard 104 to allow the user to enter text or keystroke commands. Although many other components of computer 100 are not shown, such components and their interconnection are well known to those of ordinary skill in the art. Accordingly, further details concerning the construction and composition of computer 100 and the circuit boards inside chassis 102 need not be disclosed with the present invention.

Figure 3:
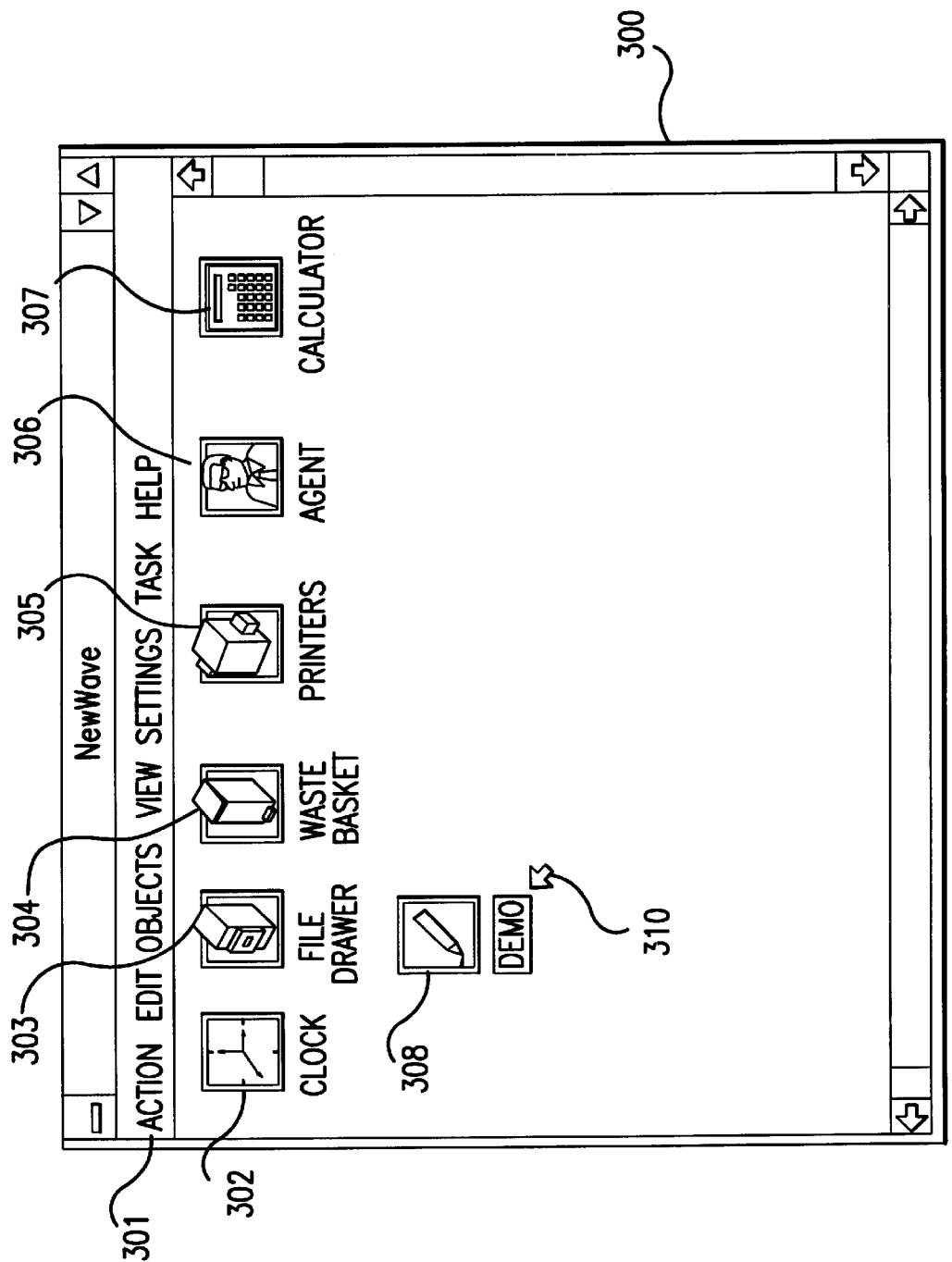
FIG. 3 illustrates the appearance of a computer desktop metaphor as used by a graphical user interface.

When the computer 100 is running, program instructions stored on a floppy disk in floppy drive 112, or on hard drive 114, or in memory 208 that comprise a graphical user interface (GUI) program are executed by CPU 210 causing the graphical elements that comprise the user's view of the graphical user interface to be displayed on screen 108. FIG. 3 shows the appearance of screen 108 with one possible graphical user interface displaying a desktop metaphor. The GUI displays a computer desktop window 300 with a menu bar 301. Inside window 300 icons are displayed that each represent an object. For example icons 302, 303, 304, 305, 306, 307, and 308 are shown. Each of these icons represent a file, a program, a shortcut, or a tool or some other type of computer functionality. For example, icon 308 represents an object called DEMO that is associated with a word processing program. In this case, object DEMO represents a file containing a document from a word processing program. The file represented by object DEMO may be opened, for example, by using mouse 110 to place cursor 310 over icon 308, and depressing a button on mouse 110 twice in quick succession. The GUI would then take the steps to load and execute the word processing program and to tell the word processing program to use the file represented by the object DEMO.

Many GUIs, such as Microsoft WINDOWS™, include the ability to create an object known as a shortcut and to place that object on the computer desktop. Shortcuts are quick ways to get to programs and files that are used often. For example, if the user creates a shortcut to run a word processor, an icon representing that word processor would appear on the computer desktop displayed on the screen. Then, to run the word processor, the user just presses a mouse button twice while the cursor is over that icon, and it will run the word processor. Or, to edit a particular file in the word processor, the user may drag and drop an icon representing that file onto the icon representing the word processor, and the word processor will start up and load that file. The user may also create a shortcut representing the file to be edited. Then, for example, when the mouse 110 is used to place cursor 310 over the icon representing the shortcut to the file, and a button on the mouse 110 is depressed twice in quick succession, the program for editing that type of file will be executed and that file loaded.

All of these actions involve some type of file access. For example, to edit a file, that file is accessed so that it may be loaded by the appropriate program. Likewise, when a shortcut icon is double-clicked on, or when an icon representing another object is dropped on that icon, the program or file represented by that shortcut icon is accessed so that the appropriate action may be taken. Even when an object simply represents a program executing that program can be viewed as a file access since a program is merely a file containing code that is executed by the computer 100, and that file must be accessed by the operating system to load and execute that program. Furthermore, GUI actions that are more involved and less convenient, such as running a program by choosing it from a pop-up menu involve the same types of files accesses. Accordingly, throughout the rest of this document, files should be interpreted to include both program (or executable) files as well as data, or other types of files. Additionally, file accesses should be interpreted to include both accessing program files to execute them as well as accessing data, program, or other types of files to perform other operations using those files.

Figure 4:
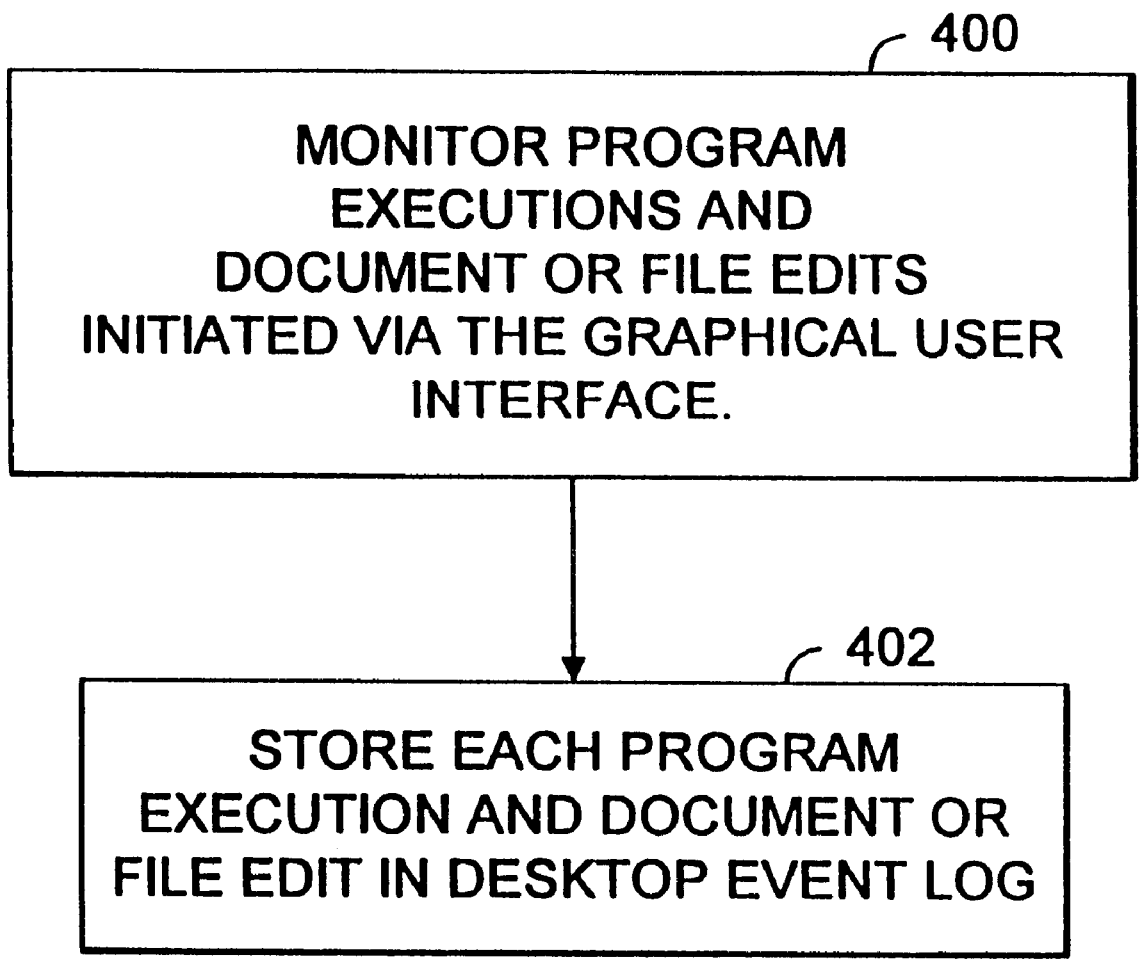
FIG. 4 is a flow chart summarizing the steps to log file accesses initiated by the user's interaction with a graphical user interface.

FIG. 4 is a flow chart that summarizes the steps that may be used to log file accesses that are initiated by the user's interaction with the GUI. All, or part, of these steps may be done by the GUI, the operating system, a low-level process running in the background, an application, or any combination of the preceding. In a step 400, the files accessed via the graphical user interface are monitored. In a step 402, a reference to each file accessed, is stored in a log along with a time stamp indicating when the event occurred. This desktop event log may be stored in memory or on a disk. The desktop event log may be kept in any format including a proprietary binary format, or a textual form.

Figure 5A:
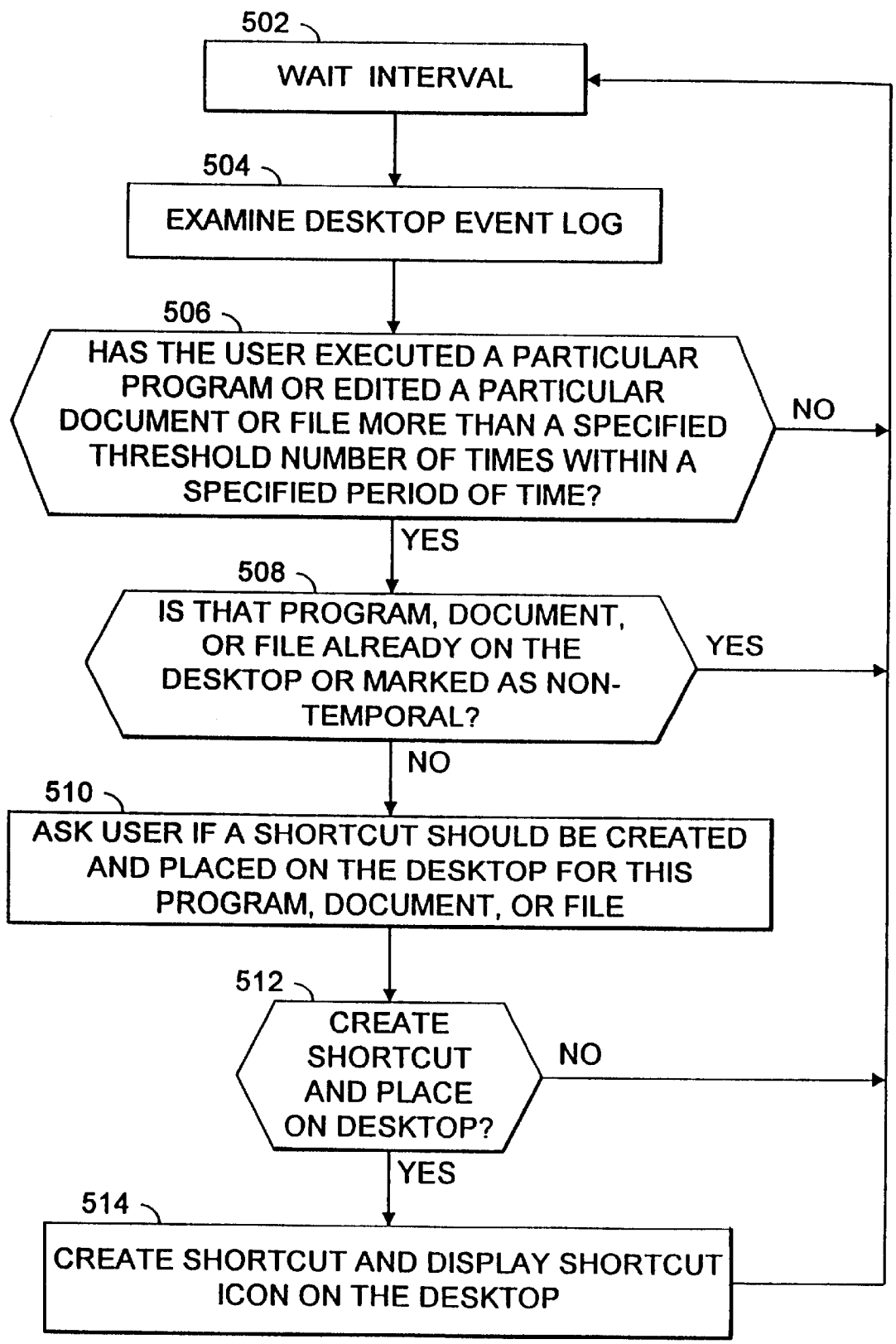
FIG. 5A is a flow chart that summarizes the steps to automatically, or semi-automatically create a shortcut for frequently accessed files.

FIG. 5A is a flow chart that summarizes the steps that may be used to automatically, or semi-automatically create a shortcut for frequently accessed files and place a representation of that shortcut on the computer desktop. All, or part, of these steps may be done by the GUI, the operating system, a low-level process running in the background, an application, or any combination of the preceding. In a step 502, an interval is waited. This interval may be measured in time units, or as a predetermined number of GUI commands. It may also be desirable to wait until the computer 100 is mostly idle so that the process to automatically create a shortcut does not slow the execution of other computer tasks. In a step 504 the desktop event log is examined to see if a particular file meets the criteria for creating a shortcut. If a particular file has been accessed by the user through the GUI more than a specified threshold number of times within a specified period, it meets the criteria for creating a shortcut. The specified period may be measured in time units, or in GUI commands. Examining the desktop event log may be accomplished by successively looking at portions of the log that represent the specified period and then counting the number of occurrences of each file to see if there are more than the specified threshold number of occurrences of that file in that portion of the desktop event log. There are many other ways that are well known in art to examine the desktop event log to see if a particular file has been accessed more than a specified threshold number of times within a specified period.

The specified period, and the specified threshold number of times a file must occur in the desktop event log within that specified period before it is considered for the creation of a shortcut may both be initially set to a default values. However, it is desirable to let the user adjust those values through a variety of means that are well known in the art. One such example is a "control panel" program that is used to set system parameters.

In a step 506, if no file meets the criteria for creating a shortcut, the process loops back to step 502 to wait. If a file meets the criteria, step 508 checks to see if a shortcut representing that file is already displayed on the computer desktop, or if it has been marked as non-temporal. If a shortcut representing that file is already displayed on the computer desktop, there is no reason to create another one and the process loops back to step 502 to wait. Furthermore, if that file is marked as non-temporal, then the process is not allowed to operate on this file so non-temporal files cannot be placed on the computer desktop by the process. Since the process cannot place a shortcut representing this file on the computer desktop, the process loops back to step 502 to wait.

In a step 510, the user is asked if a shortcut should be created for this file. This step is optional. It is desirable, however, to ask the user if a shortcut should be created so the user will not be surprised by the appearance of a new icon on the computer desktop, and to allow the user to avoid clutter on the computer desktop, and optionally to allow the user to position the icon on the computer desktop. In a step 512, if the user indicates that a shortcut should not be created, the process loops back to step 502 to wait. If the user indicates that a shortcut should be created, a shortcut is created and an icon representing the file is placed on the computer desktop in a step 514. The process then loops back to step 502 to wait.

Files may be marked as temporal or non-temporal by the user through a variety of means well known in the art. For example, a default setting that marks all files ending with the ".EXE" as temporal could be used. This default could be overridden by a variety of means well known in the art such as a "properties" dialog box.

Figure 5B:
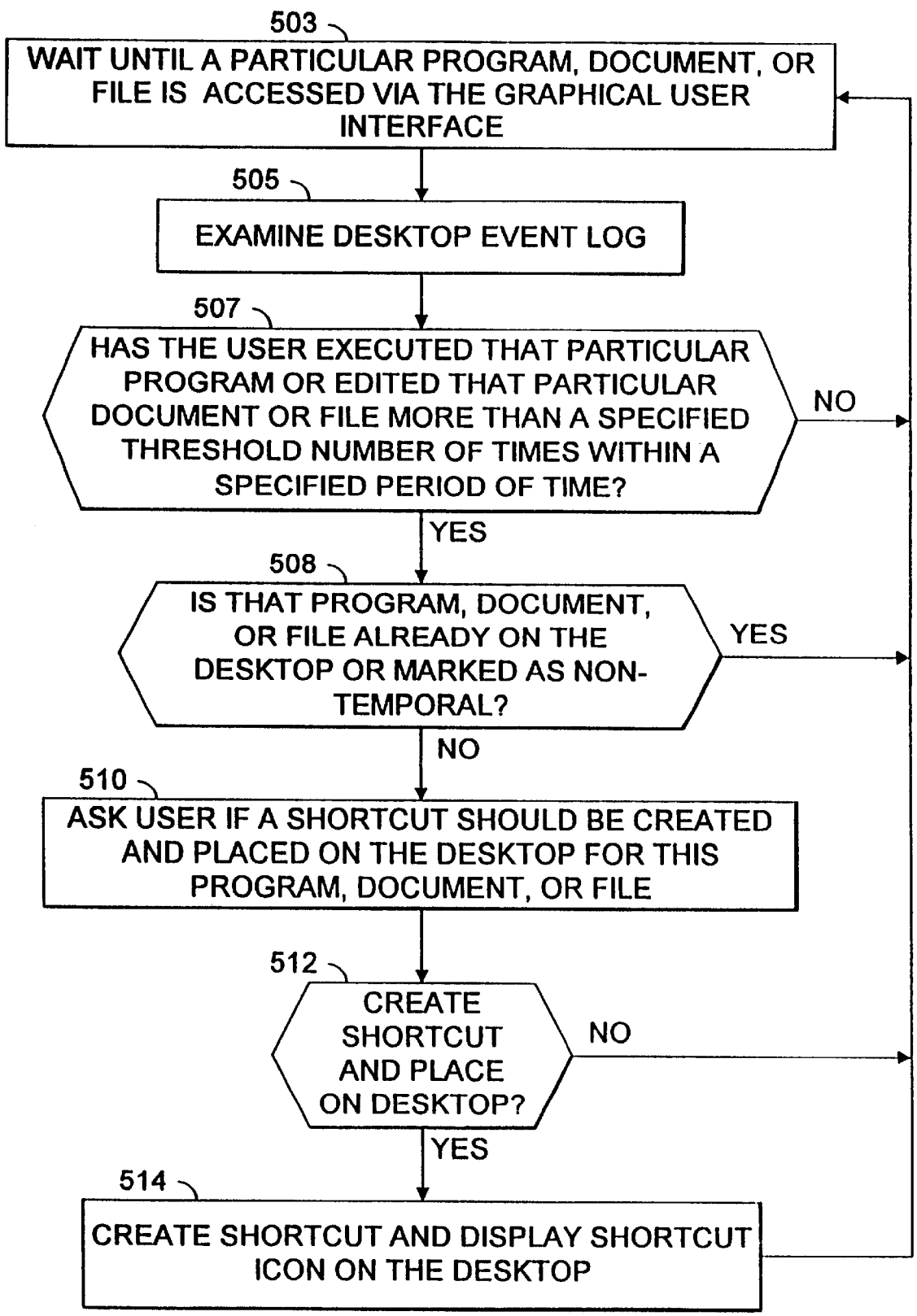
FIG. 5B is a flow chart that summarizes the steps to automatically, or semi-automatically create a shortcut for frequently accessed files at the time they are accessed by the user via the graphical user interface.

FIG. 5B is a flow chart that summarizes the steps that may be used to automatically, or semi-automatically create a shortcut for frequently accessed files at the time they are accessed by the user and place a representation of that shortcut on the computer desktop. All, or part, of these steps may be done by the GUI, the operating system, a low-level process running in the background, an application, or any combination of the preceding. In a step 503, the process waits until a file is accessed by the user via the GUI. In a step 505 the desktop event log is examined to see if that particular file meets the criteria for creating a shortcut. If that particular file has been accessed by the user through the GUI more than a specified threshold number of times within a specified period, it meets the criteria for creating a shortcut. The specified period may be measured in time units, or in GUI commands. Examining the desktop event log may be accomplished by successively looking at portions of the log that represent the specified period and then counting the number of time that file occurs to see if there are more than the specified threshold number of occurrences of that file in that portion of the desktop event log. There are many other ways that are well known in art to examine the desktop event log to see if that particular file has been accessed more than a specified threshold number of times within a specified period.

The specified period, and the specified threshold number of times that the file must occur in the desktop event log within that specified period before it is considered for the creation of a shortcut may both be initially set to a default values. However, it is desirable to let the user adjust those values through a variety of means that are well known in the art. One such example is a "control panel" program that is used to set system parameters.

In a step 507, if that file does not meet the criteria for creating a shortcut, the process loops back to step 503 to wait. If a file meets the criteria, step 508 checks to see if a shortcut representing that file is already displayed on the computer desktop, or if it has been marked as non-temporal. If a shortcut representing that file is already displayed on the computer desktop, there is no reason to create another one and the process loops back to step 503 to wait. Furthermore, if that file is marked as non-temporal, then the process is not allowed to operate on this file so non-temporal files cannot be placed on the computer desktop by the process. Since the process cannot place a shortcut representing this file on the computer desktop, the process loops back to step 503 to wait.

In a step 510, the user is asked if a shortcut should be created for this file. This step is optional. It is desirable, however, to ask the user if a shortcut should be created so the user will not be surprised by the appearance of a new icon on the computer desktop, and to allow the user to avoid clutter on the computer desktop, and optionally to allow the user to position the icon on the computer desktop. In a step 512, if the user indicates that a shortcut should not be created, the process loops back to step 503 to wait. If the user indicates that a shortcut should be created, a shortcut is created and an icon representing the file is placed on the computer desktop in a step 514. The process then loops back to step 503 to wait.

Figure 6:
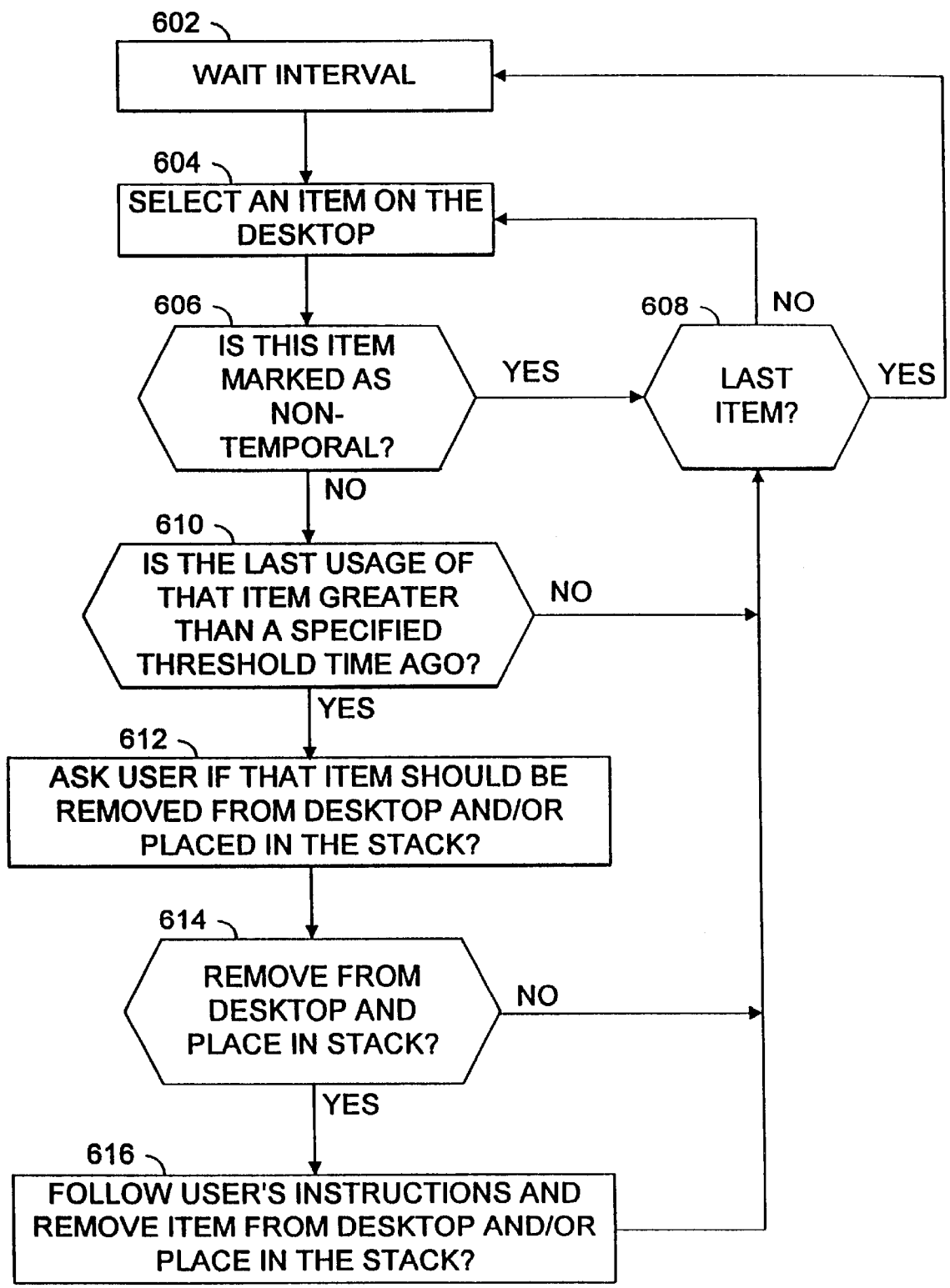
FIG. 6 is a flow chart that summarizes the steps to automatically, or semi-automatically remove infrequently used objects from the computer desktop.

FIG. 6 is a flow chart that summarizes the steps that may be used to automatically, or semi-automatically remove objects on the computer desktop that are infrequently used. All, or part, of these steps may be done by the GUI, the operating system, a low-level process running in the background, an application, or any combination of the preceding. In a step 602 an interval is waited. This interval may be measured in time units, as a predetermined number of GUI commands, or as a predetermined number of boot-ups or logins. It may also be desirable to wait until the computer 100 is mostly idle so that the process to remove items from the computer desktop does not slow the execution of other computer tasks. In a step 604 an item that appears on the computer desktop is selected. In a step 606 the process checks to see if the item has been marked as non-temporal. If the item has been marked non-temporal, then it will not be removed from the computer desktop even if it has not been used in a long time and the process will proceed to a step 608 to see if this is the last item on the computer desktop to be considered for removal. If it is not the last item, the process proceeds to step 604 to select another item on the computer desktop to consider for removal.

If the item was not marked as non-temporal (i.e. marked as temporal), step 610 checks the desktop event log, or some other usage information, to see if the last usage of that item was more than a specified threshold amount of time ago. This threshold amount of time may be measured in time units, as a predetermined number of GUI commands, or as a predetermined number of boot-ups or logins. If the item has been used more recently than the specified threshold amount of time, then the process proceeds to step 608. If the item has not been used more recently than the threshold amount of time, then the process proceeds to step 612 where the user is asked if that item should be removed from the computer desktop completely, or removed from the computer desktop and placed in the stack. This step is optional. It is desirable, however, to ask the user if this item should be removed so the user will not be surprised by the disappearance of an item on the computer desktop. It is also desirable to ask the user whether the item should be removed completely, or whether it should just be moved to a special location where it may be easily retrieved and placed back on the computer desktop. This special location, called a stack, may contain many items that have been removed from the computer desktop. This stack is analogous to a stack of papers that accumulate on a physical desktop. An appropriate icon representing the stack may be displayed on the computer desktop to allow the user to easily access these items that have been removed from the computer desktop and to retrieve items from the stack and place them back on the computer desktop.

In a step 614, if the user indicated that the item should not be removed, the process loops back to step 608. If the user indicated that the item should be removed, then in a step 616, the process follows the user's instructions and removes the item completely, or places the item in the stack. If optional step 612 is not executed, step 616 would always be completed and the item would either be removed completely, or removed and placed in the stack depending on the desired default operation specified.

Figure 7:
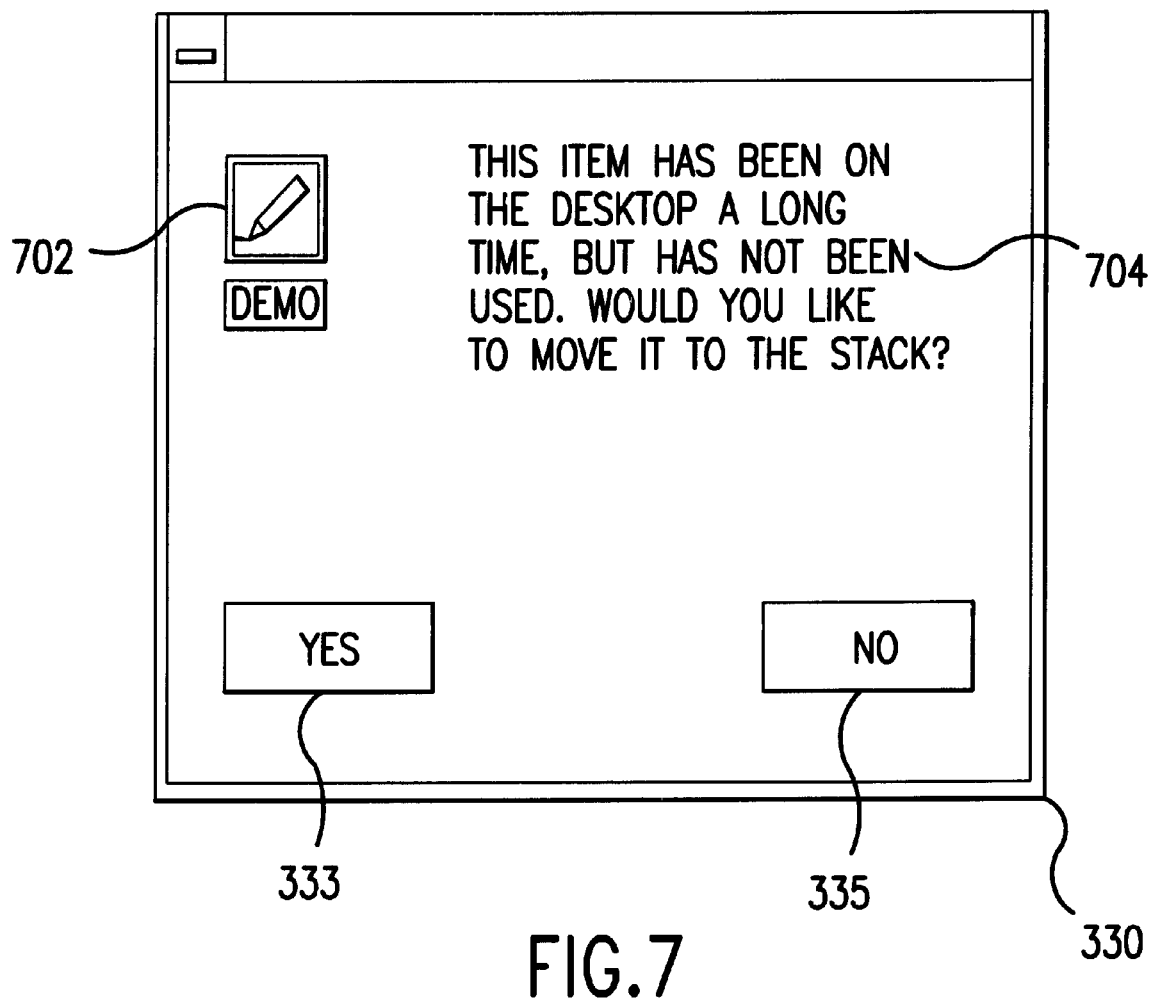
FIG. 7 illustrates an example of a dialog box that can be used to interrogate the user whether or not a particular object should be removed from the computer desktop.

FIG. 7 illustrates an example of a dialog box 330 displayed on screen 108 that can be used to ask the user if an item should be removed from the computer desktop. A graphical representation of the item as it is displayed on the computer desktop 702 is displayed along with text 704 that explains the choice the user needs to make. The user may then choose to remove the item by positioning the cursor over the "YES" button 333 and depressing a mouse button. Alternatively, the user may choose to keep the item on the computer desktop by positioning the cursor over the "NO" button 335 and depressing a mouse button.

The above description is included to illustrate the preferred embodiments. It is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A computer operable method, comprising the steps of:
   (a) automatically selecting a file that satisfies a first set of criteria, said first set of criteria defining when said file has been selected by a user more frequently than a first frequency, wherein selections comprise icon selections and dialog box selections:
   (b) automatically displaying an icon representing said file on a computer screen after said file has been selected, wherein said icon was not displayed immediately prior to selection.

2. The method of claim 1, wherein said first frequency is defined as when said file has been selected more than a specified number of times in less than a specified amount of time.

3. The method of claim 2, further comprising the step of:
   (c) keeping a log of files selected in a desktop event log, wherein said files selected include program files selected to be executed and data files selected to perform other operations using those files and wherein said files selected comprise files whose selection is initiated by a graphical user interface (GUI).

4. The method of claim 2, wherein step (b) includes:
   (b.1) prompting a user for a user response; and
   (b.2) creating a shortcut represented by said icon in response to said user response.

5. The method of claim 2, wherein a user may set a first property associated with a specific file to prevent said first set of criteria from being satisfied for said specific file.

6. The method of claim 5, wherein a user may set said first property for a group of files.

7. A program storage medium readable by a computer, tangibly embodying a program of instructions executable by the computer to perform method steps for automatically displaying an icon representing a file that is frequently selected by a graphical user interface (GUI), said method steps comprising:
   (a) automatically selecting a file that satisfies a first set of criteria, said first set of criteria defining when said file has been selected by a user more frequently than a first frequency, wherein selections comprise icon selections and dialog box selections;
   (b) automatically displaying an icon representing said file on a computer screen after said file has been selected, wherein said icon was not displayed immediately prior to selection.

8. The program storage medium of claim 7, wherein said first frequency is defined as when said file has been selected more than a specified number of times in less than a specified amount of time.

9. The program storage medium of claim 8, further comprising the step of:
   (c) keeping a log of files selected in a desktop event log, wherein said files selected include program files selected to perform other operations using those files and wherein said files selected comprise files whose selection is initiated by a graphical user interface (GUI).

10. The method of claim 8, wherein step (b) includes:
    (b.1) prompting a user for a user response; and
    (b.2) creating a shortcut represented by said icon in response to said user response.

11. The program storage medium of claim 8, wherein a user may set a first property associated with a specific file to prevent said first set of criteria from being satisfied for said specific file.

12. The program storage medium of claim 11, wherein a user may set said first property for a group of files.

13. A graphical user interface (GUI) that is implemented on a computer, comprising:
    (a) means for automatically selecting a file that satisfies a first set of criteria, said first set of criteria defining when said file has been used frequently;
    (b) means for automatically displaying an icon representing said file on a computer screen after said file has been selected, wherein said icon was not displayed immediately prior to selection.

14. The graphical user interface of claim 13, wherein said first set of criteria is satisfied when said file has been selected more than a specified number of times in less than a specified amount of time.

15. The graphical user interface of claim 14, further comprising:
    (c) means for keeping a log of files selected in a desktop event log, wherein said files selected include program files selected to be executed and data files selected to perform other operations using those files and wherein said files selected comprise files whose selection is initiated by said graphical user interface (GUI).

16. The graphical user interface of claim 14, wherein said means for displaying includes:
    (b.1) means for prompting a user for a user response; and
    (b.2) means for creating a shortcut represented by said icon in response to said user response.

17. The graphical user interface of claim 14, wherein a user may set a first property associated with a specific file to prevent said first set of criteria from being satisfied for said specific file.

18. The graphical user interface of claim 17, wherein a user may set said first property for a group of files.

* * * * *